United States Patent [19]

Geno

[11] Patent Number: 4,718,650
[45] Date of Patent: Jan. 12, 1988

[54] AIR SPRING FOR VEHICLE

[75] Inventor: Wayne H. Geno, Cicero, Ind.

[73] Assignee: The Firestone Tire & Rubber Company, Akron, Ohio

[21] Appl. No.: 877,950

[22] Filed: Jun. 23, 1986

[51] Int. Cl.$^4$ ............................................. F16F 9/04
[52] U.S. Cl. ............................ 267/64.27; 267/64.24; 267/64.21
[58] Field of Search ............... 267/64.27, 64.12, 64.21, 267/64.23, 64.24, 35

[56] References Cited

U.S. PATENT DOCUMENTS

| 4,965 | 2/1847 | Lewis | 267/64.23 |
|---|---|---|---|
| 2,926,011 | 2/1960 | Slemmons | 267/65 |
| 2,960,333 | 11/1960 | McGavern et al. | 267/64.24 |
| 2,973,953 | 3/1961 | Fikse | 267/64.27 X |
| 2,978,256 | 4/1961 | Bertsch | 280/124 |
| 2,985,445 | 5/1961 | Bowser | 267/65 |
| 3,074,709 | 1/1963 | Ballard | 267/65 |
| 3,154,318 | 10/1964 | Hutchens | 280/104 |
| 3,627,298 | 12/1971 | Gaydecki | 267/64.24 X |
| 3,682,464 | 8/1972 | Krejcir | 267/64.24 |
| 3,895,787 | 7/1975 | Niehaus | 267/3 |
| 4,518,154 | 5/1985 | Merkle | 267/34 |
| 4,564,177 | 1/1986 | Leonard | 267/35 X |

FOREIGN PATENT DOCUMENTS 2037934 11/1978 United Kingdom .
2044395 3/1979 United Kingdom .
2028463 3/1980 United Kingdom .
2043831 10/1980 United Kingdom .

Primary Examiner—Joseph Falk
Attorney, Agent, or Firm—Ronald Brietkrenz

[57] ABSTRACT

An air spring for motor vehicles which includes first and second axially spaced piston members with an intervening flexible sleeve forming a fluid pressure chamber therebetween sealingly connected to the piston members. The sleeve has a greater axial length than the at-rest spacing between the piston members resulting in opposed rolled sleeve ends. The rolled sleeve ends extend about an annular-shaped member which surrounds the first piston members when in the at-rest position. The second piston member has an annular-shaped outer wall which extends telescopically about the first piston member and within the other annular-shaped member thereof when the air spring is in a collapsed or jounce position with the rolled ends forming about and within the annular-shaped members of the first piston member and outer wall of the second piston member. The rolled ends of the sleeve unroll to provide increased axial length to the sleeve enabling the piston members to move axially apart beyond the at-rest position and into an extended position providing an air spring with a large stroke with a minimum at-rest height.

11 Claims, 10 Drawing Figures

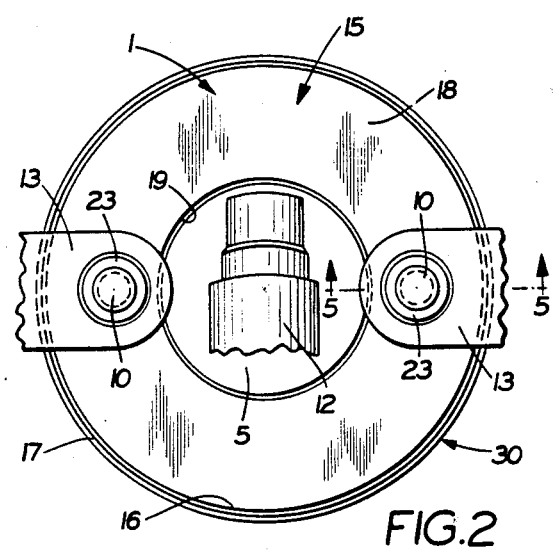
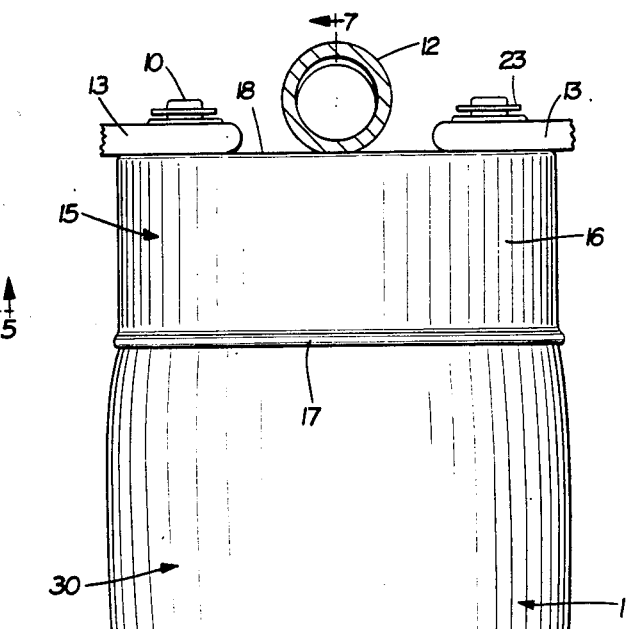
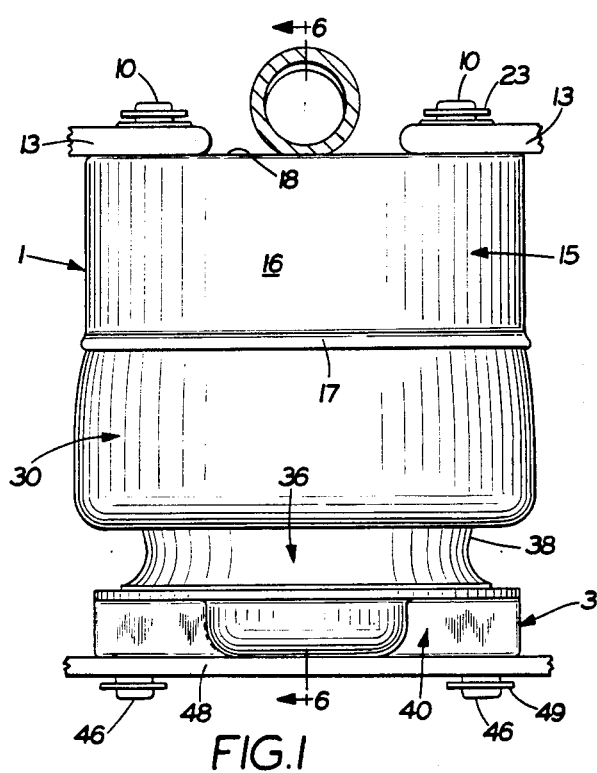
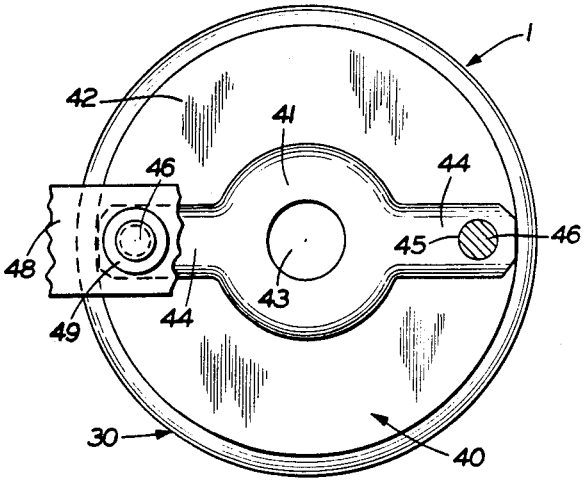
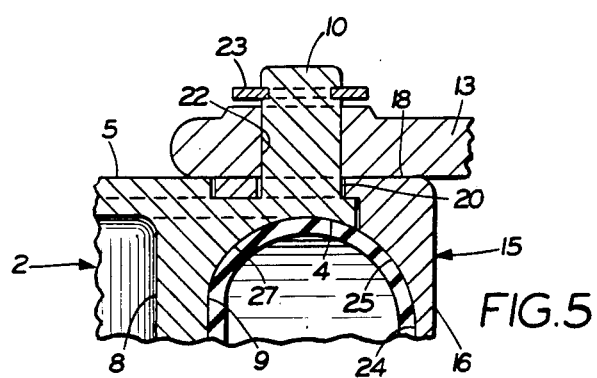

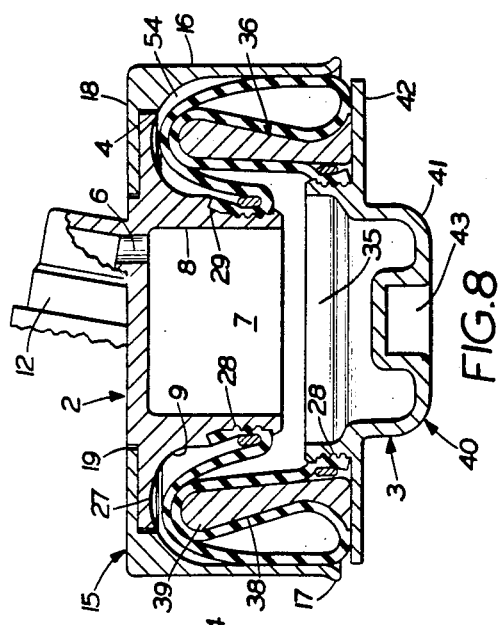
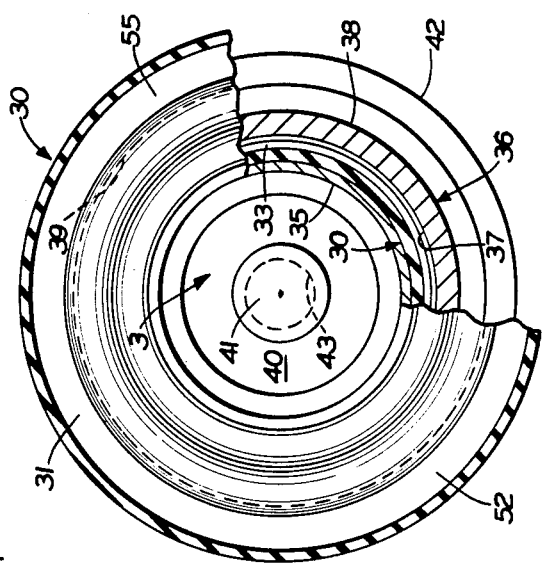
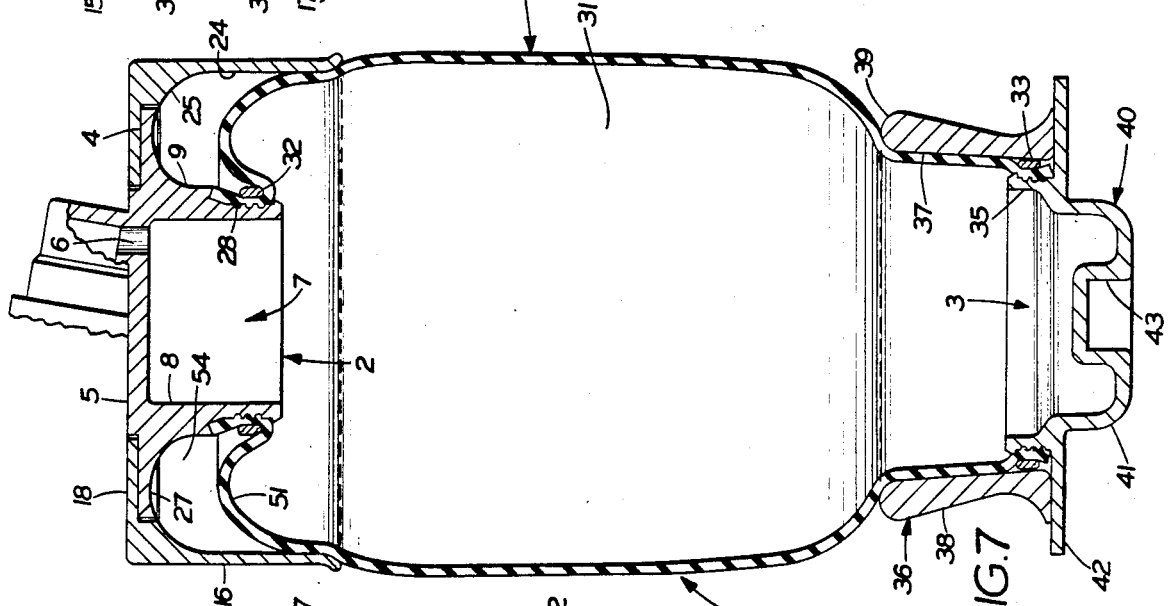
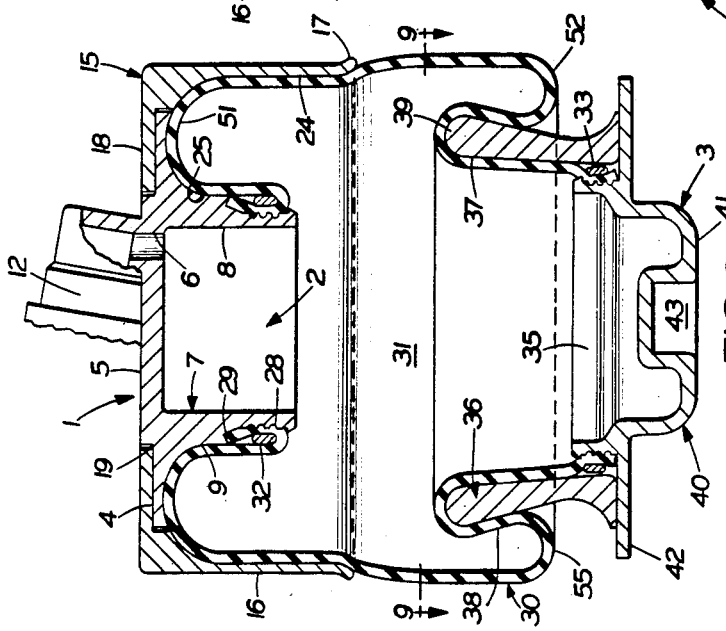
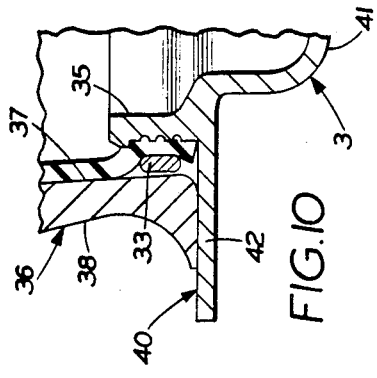

AIR SPRING FOR VEHICLE

TECHNICAL FIELD

The invention relates to vehicle suspensions and particularly to an air spring having a low operating height while providing a normal stroke required for most motor vehicles.

BACKGROUND ART

Pneumatic springs, commonly referred to as air springs, have been used with motor vehicles for a number of years to provide cushioning between movable parts of the vehicle primarily to absorb shock loads impressed on the vehicle axles by the wheels striking an object in the road or falling into a depression. These air springs usually consist of a flexible rubber sleeve or bellows containing a supply of compressed air and having one or more pistons located within the flexible resilient bellows or sleeves to cause compression and expansion as the vehicle experiences the road shocks. The pistons cause compression and expansion of the fluid within the spring sleeve with the sleeve being of a flexible material permitting the pistons to move axially with respect to each other within the interior of the sleeve. The ends of the sleeve usually are sealingly connected to the piston or supporting structure. Many of the pressure chamber forming sleeves of these prior art air springs are bellow shaped or have rolled ends to permit the pistons to move axially with respect to each other between a jounce or collapsed position and a rebound or expended position without damaging the flexible sleeve in which the pistons are located.

U.S. Pat. No. 2,926,011 shows an air spring having a variable contour piston which is connected between a vehicle under carriage and frame. A piston diaphram has inwardly directed portions and ends which are attached to a top piston plate and to a resting plate.

U.S. Pat. No. 2,985,445 discloses a pneumatic spring control device which comprises an air spring assembly having a dome shaped metal body with a peripheral lip and a circular bellows retainer ring. A spring piston is attached to the other end of the bellows assembly and is rigidly mounted to a vehicle wheel supporting arm to reciprocate with the wheel in an arcuate path into and out of the dome.

U.S. Pat. No. 2,978,256 shows a dual height suspension control mechanism having an air spring which includes an upper generally inverted cup shaped cylinder secured to the outer end of a frame member. A cylindrical piston moves into and out of the generally inverted dome-shaped assembly. The assembly and the cylinder are attached to each other by a single convolution flexible bellows having an inner bead portion engaging an inturned lip of the piston.

U.S. Pat. No. 3,046,000 discloses a vehicle suspension spring assembly which includes an inverted cup-shaped member and a hollow piston. The piston is rigidly secured to an outer wall of a hydraulic shock absorber cylinder and a flexible diaphragm element of the rolling lobe type is attached at one end to the upper end of the piston and at its other end to a lower peripheral wall of a dome. When the spring assembly is deflected upwardly, a stiker moves upwardly and downwardly with a shock absorber casing along the axis of the piston rod without engaging a rubber buffer.

U.S. Pat. No. 3,074,709 shows an air suspension system for a motor vehicle which includes a movable piston in a housing. A flexible expansible material attaches the bead of a metallic cup to the bead of another element.

U.S. Pat. No. 4,518,154 discloses a pneumatic motor vehicle spring which includes cup-shaped pistons which are connected to each other by a flexible bellow. Relatively rigid sleeves are provided which extend about the exterior of the flexible bellows. Two pistons are elastically connected to provide an axial distance between the pistons as a function of the pressure within the volume defined by the spring.

Some other examples of prior art air springs for vehicles are shown in U.S. Pat. Nos. 3,154,318 and 3,895,787 and in U.K. Patent Application Nos. 2 028 463; 2 037 934; 2 043 831; and 2 044 395.

A common problem with known air spring constructions of the type shown in several of the above listed patents is that for many vehicles, a limited amount of space is available for mounting the air spring between the movable components of the vehicle. This seriously limits the operating height of the spring and limits the stroke distance of the pistons and sleeve required for the satisfactory operation of the spring for many vehicles on which the springs are mounted.

Therefore, the need has existed for an improved air spring construction which permits a normal vertical stroke movement with a reduced at-rest or operating height.

DISCLOSURE OF THE INVENTION

Objectives of the invention include providing an improved air spring construction for motor vehicles having a piston at both ends of a flexible sleeve, one of which is a low rate piston, and the other being a high rate piston with a circumferential or annular-shaped member surrounding the high rate piston to provide better vertical rate control and to restrict the diameter of the elastomeric sleeve extending between the two pistons. Another objective is to provide such an improved air spring in which at minimum height conditions, one of the pistons telescopically fits inside the other piston allowing for a lower operating height of the spring.

A still further objective of the invention is to provide such an improved air spring in which at the extended position, rolled ends of the elastomeric sleeve pull away from the body of the pistons to allow for extreme height movement, and in which at the operating height of the sleeve, the rubber rolls about the low rate piston at one end, with the other end of the elastomeric sleeve rolling about a part of the high rate piston being confined within an outer annular-shaped member surrounding the piston thereby enabling the elastomeric sleeve to have excess rubber when in the at-rest position to provide an increased stroke length. A further objective is to provide such an improved air spring in which a pressurized air control valve is mounted on one of the pistons and communicates with the interior of the flexible sleeve whereby positive air pressure can be maintained at all times within the sleeve when operating to prevent the elastomeric sleeve from becoming pinched between the pistons. Another objective is to provide such an air sleeve in which the low rate piston has an annular wall with a conical shaped outer surface about which the connected rolled end of the sleeve folds when the pistons are telescopically engaged when in the jounce or collapsed condition.

A still further objective of the invention is to provide such an improved air spring in which the low rate piston is of a two-piece construction having an annular-shaped outer wall mounted by a pair of posts to a disc shaped base of the second member with the rolled end of the sleeve being clamped by a band within the confines of the annular-shaped wall, whereby a portion of the rolled end extends along the inside surface of this outer wall and over and about a smooth outer edge thereof; and in which the other rolled end of the flexible sleeve is sealingly connected by a band to the outer surface of the high rate piston member from which it rolls about an inverted U-shaped wall formed by the piston and a surrounding annular-shaped outer member. Another objective is to provide such an improved air spring in which the parts can be stamped inexpensively of sheet metal or formed of plastic or other rigid material and assembled with the elastomeric sleeve by a pair of clamping bands to form a sturdy and durable construction.

These objectives and advantages are obtained by the improved air spring of the invention, the general nature of which may be stated as including: first and second piston members located in a generally predetermined axial spaced relationship when in an at-rest position, said piston members being adapted to be mounted on spaced portions of a vehicle and movable towards and away from each other; a fluid pressure chamber formed between the piston members by a flexible sleeve sealingly connected to said piston members at opposite ends of said sleeve, said sleeve having a greater axial length than the length required to extend between said piston members when in the at-rest position forming a rolled end at each end of said sleeve; an annular-shaped member extending about the first piston member with one of the rolled ends of said flexible sleeve extending about and located between portions of said first piston member and said annular-shaped member when in the at-rest position; and the second piston member having an annular-shaped outer wall configured to move axially telescopically about the first piston member and within the confines of the annular-shaped member thereof when the piston members move axially toward each other from the at-rest position toward a jounce position, and with the rolled ends moving towards an unrolled state as the piston members move axially apart from the at-rest position toward an extended position.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 1 is a elevational view of the improved air spring in a static or at-rest position mounted on spaced components of a vehicle with a pressure air valve shown in section;

FIG. 2 is a top plan view of the air spring of FIG. 1;

FIG. 3 is a bottom plan view of the air spring of FIG. 1 with the vehicle mounting bracket being removed;

FIG. 4 is an elevational view showing the air spring in an extended position, with portions broken away and in section;

FIG. 5 is an enlarged fragmentary sectional view taken on line 5—5, FIG. 2;

FIG. 6 is a longitudinal sectional view taken on line 6—6, FIG. 1, showing the air spring in the static or at-rest position;

FIG. 7 is a longitudinal sectional view taken on line 7—7, FIG. 4, showing the air spring in the extended position;

FIG. 8 is a longitudinal sectional view similar to FIGS. 6 and 7 showing the air spring in a jounce or collapsed position;

FIG. 9 is a sectional view taken on line 9—9, FIG. 6; and

FIG. 10 is a enlarged fragmentary sectional view of the lower left-hand portion of FIG. 7.

Similar numerals refer to similar parts throughout the drawings.

BEST MODE FOR CARRYING OUT THE INVENTION

The improved air spring is indicated generally at 1 and is shown in an at-rest position at FIGS. 1 and 6, in an extended position in FIGS. 4 and 7, and in a collapsed or jounce position in FIG. 8. Improved air spring 1 includes a pair of piston members indicated generally at 2 and 3, hereinafter referred to as a high rate piston and low-rate piston, respectively. High rate piston 2 is a cup-shaped member having a disc-shaped end wall 4 with a raised circular center portion 5. A hole 6 is formed in raised portions 5 to provide a pressurized air inlet opening. A standard pressurized air control valve 12 is mounted on raised portion 5 and communicates with hole 6. Valve 12 is shown fragmentarily in several of the views and is a readily available component and forms no particular part of the invention.

Piston member 2 includes a generally cylindrical side wall indicated generally at 7 and has a smooth cylindrical inner surface 8 and an annular irregularly shaped outer surface 9. A pair of diametrically opposite posts 10 project upwardly from end wall 4 in an opposite direction from cylindrical wall 7 for mounting air spring 1 on a vehicle bracket 13 as shown in FIGS. 1–5. A cup-shaped member indicated generally at 15, is mounted on and surrounds piston member 2. Member 15 has an annular-shaped outer wall 16 terminating in slightly flared outer end 17, and an end wall 18. A central opening 19 is formed in end wall 18 through which raised portion 5 of piston end wall 4 extends as shown particularly in FIGS. 2 and 6–8.

A pair of spaced holes 20 are formed in end wall 18 of cup-shaped member 11 through which posts 10 extend (FIG. 5) for joining piston member 2 with cup shaped member 15 and for mounting the joined members to vehicle bracket 13 as shown in FIG. 5. Posts 10 extend through aligned holes 22 formed in vehicle bracket 13 with a spring clip 23 locking the posts onto bracket 13.

Cylindrical wall 16 of cup-shaped member 15 has a smooth cylindrical inner surface 24 which terminates in a curved inner corner 25 which mates with a smooth annular-shaped concave surface 27 extending along the inner surface of end wall 4. Surface 27 then merges into a smooth cylindrical portion of outer surface 9 of piston cylindrical wall 7 to form a generally inverted U-shaped surface configuration as shown particularly in FIGS. 5–8. The extended end of cylindrical wall 7 is formed with a plurality of annular grooves 28 to provide a surface for clamping an upturned end 29 of flexible sleeve 30 thereto.

Flexible sleeve 30 is formed of an elastomeric material and forms a fluid pressure chamber 31 between pistons 2 and 3 for containing a supply of pressurized fluid preferably air, which is injected into chamber 31 through valve 12 and inlet hole 6. In accordance with one of the features of the invention, flexible sleeve 30 has a greater axial length than that required to extend between pistons 2 and 3 when the pistons are in the at-rest position as shown in FIG. 6. Sleeve 30 is sealingly connected to each piston members 2 and 3 by clamping bands 32 and 33, respectively. Band 32 sealingly clamps the upturned end 29 of sleeve 30 against annular grooves 28 of cylindrical wall 7, and band 33 clamps the opposite end of sleeve 30 against a grooved outer surface of an upstanding cylindrical wall 35 of low rate piston member 3 (FIGS. 6 and 10).

Low rate piston member 3 preferably is a two piece member having an annular-shaped outer wall indicated generally at 36, which is mounted on a base member 40. Wall 36 has a smooth generally tapered conical inner surface 37 and a smooth concavely shaped outer surface 38 joined by a rounded top edge 39. Base member 40 includes an annular disc-shaped base 42 formed with an outwardly extending boss 41 which is concentric with wall 35 and extends in an opposite direction therefrom. A recessed central portion 43 is formed in boss 41 and a pair of outwardly extending arms 44 extend radially from boss 41 along the outer surface of base 42 (FIG. 3). Holes 45 (FIG. 4) are formed in the outer ends of arms 44 through which a pair of posts 46 project, which posts are formed integrally with and extend outwardly from annular outer wall 36. Posts 46 extend through holes 47 formed in a bracket 48, which bracket is attached to a desired component of the motor vehicle. A snap ring 49 locks the assembled outer wall 36 to base member 40 to form piston member 3 in addition to attaching piston member 3 on vehicle bracket 48 as shown particularly in FIGS. 1 and 4.

As set forth above, flexible sleeve 30 has a greater axial length than that required to extend between its attached end positions with piston members 2 and 3 when in the normal or at-rest position on a vehicle as shown in FIGS. 1 and 6. This excess length of sleeve 30 forms rolled ends 51 and 52. Rolled end 51 extends about and follows the smooth continuous inverted U-shaped surface formed by surfaces 9, 27, and 24 as shown in FIGS. 6 and 7. Rolled end (51) is retained within the generally inverted U-shaped annular spaced 54 formed between cylindrical side wall 16 of cup-shaped member 15 and surfaces 9 and 27 of piston member 2. Rolled end 52 extends about low rate piston member 3 when in the at-rest position and lies along conical surface 37 of annular outer wall 36 and over and about rounded top edge 39 and downwardly along a portion of concave outer surface 38 prior to forming a reverse bend 55 in the elastomeric material of sleeve 30. As can be seen in FIG. 6, rolled ends 51 and 52 provide a greater amount of rubber in the axial dimension of sleeve 30 than required to connect the ends of sleeve 30 to piston members 2 and 3.

As shown in FIG. 7, rolled ends 51 and 52 enable the pistons to move axially apart from their at-rest position of FIG. 6 into an extended position of FIG. 7 upon the vehicle wheel striking a projection or depression in a road surface enabling the air pressure in pressure chamber 31 to absorb much of the shock without stretching or fatiguing the elastomeric material of flexible sleeve 30. Furthermore, in accordance with the invention, the configuration of piston members 2 and 3 enable spring 1 to collapse into a compact position when in the jounce position as shown in FIG. 8. Piston member 2 enters into the confines of piston member 3, and in particular within the interior of annular outer wall portion 36 of piston member 3. Outer wall 36 projects into U-shaped annular space 54 formed between cylindrical wall 7 of piston member 2 and annular side wall 16 of cup-shaped member 15. Upon entering and reaching the jounce position of FIG. 8, rolled end 51 extends moves from the extended position of FIG. 7 towards the adjacent walls to gather the excess sleeve material and the opposite rolled end 52 extends further along outer surface 38 of wall 36.

Thus comparison of FIGS. 6, 7, and 8, shows one of the main and important feature of the invention as well as the results achieved thereby. The rolled ends of sleeve 30 in combination with the telescopic engagement of piston member 2 within the confines of piston member 3, and in particular within the interior of annular outer wall 16, provides an air spring which has a reduced axial length when in the normal or at-rest position in comparison to the greater axial length that is achieved in the extended position. This is accomplished by the unrolling of rolled ends 51 and 52 and the pulling away of these rolled ends from contact with the piston members followed by the ability of the pistons to move into the jounce or telescopic collapsed position of FIG. 8. Therefore, improved air spring 1 provides an increased stroke length in a shorter operating height than heretofore believed possible with existing air spring constructions.

The components of air spring 1 can be formed easily of stamped steel or rigid plastic material and assembled with sleeve 30 for subsequent mounting on vehicle mounting brackets, and in which the posts used for assembling the two component parts of low rate piston member 3 and the posts for assembling high rate piston member 2 with cup shaped member 15, also provide the means of attaching the piston members to their respective vehicle mounting brackets.

Cup-shaped member 15 can be eliminated if desired without materially effecting the concept of the invention since low rate piston member 3 still will telescopically engage and extend about high rate piston member 2 in the absence of member 15. However, it is believed that member 15 helps provide better vertical rate control and restricts the diameter of sleeve 30 at the collapsed and at-rest positions. Valve 12 is a standard component and preferably will communicate with a microprocessor located in the vehicle. Valve 12 is provided with internal valves which open and close to maintain adequate air pressure in pressure chamber 31 and will supply makeup air into the chamber in the case of leaks and will permit air to escape if too much pressure is created within the chamber.

Accordingly, the improved air spring construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved air spring for vehicles is constructed and used the characteristics of the construction, and the advantageous, new and useful results obtains; the new and useful structures, devices, elements, arrangements, parts, and combinations, are set forth in the appended claims.

What is claimed is:

1. An improved air spring for vehicles including:
    (a) first and second piston members located in a generally axial spaced relationship when in an at-rest position, said piston members being adapted to be mounted on spaced portions of a vehicle and movable towards and away from each other;
    (b) a fluid pressure chamber formed between the piston members by a flexible sleeve sealingly connected to said piston members at opposite ends of said sleeve, said sleeve having a greater axial length than the length required to extend between said piston members when in the at-rest position forming a rolled end at each end of said sleeve;
    (c) an annular-shaped member extending about the first piston member with one of the rolled ends of said flexible sleeve extending about and along said first piston member and along the inner periphery of said annular-shaped member when in the at-rest piston; and
    (d) the second piston member having an annular-shaped outer wall with the other of the rolled sleeve ends extending along an outer surface of said outer wall, said wall being configured to move axially telescopically about the first piston member and within the confines of the annular-shaped member thereof when the piston means move axially toward each other from the at-rest position toward a jounce position, and with the rolled ends moving towards an unrolled state as the piston members move axially apart from the at-rest position toward a extended position.

2. The air spring defined in claim 1 in which the outer wall of the second piston member has a conical configuration with the outer edge thereof having a smooth rounded configuration and the outer surface having concavely curved configuration.

3. The air spring defined in claim 1 in which the first piston member is generally cup-shaped with a cylindrical inner surface and an annular outer surface having a diameter less than the inside diameter of the annular-shaped outer wall of the second piston member enabling said first piston member to move axially telescopically within the confines of the second piston member in the jounce position.

4. The air spring defined in claim 1 in which valve means communicates with the pressure chamber for controlling the fluid pressure within said chamber.

5. The air spring defined in claim 1 in which the flexible sleeve is formed of an elastomeric material.

6. The air spring defined in claim 1 in which the annular-shaped member includes a disc-shaped end wall formed with a central opening and a cylindrical side wall integral with said end wall; in which the first piston member is cup-shaped with a disc-shaped end wall which projects into the central opening of the end wall of the annular-shaped member; and in which at least two outwardly projecting posts are formed on the end wall of the first piston member and extend through complementary-shaped holes formed in the end wall of said annular-shaped member for connecting said annular-shaped member to the first piston member.

7. The air spring defined in claim 1 in which bands clamp the rolled ends of the flexible sleeve against respective ones of the piston members for sealingly connecting the sleeve to the piston members.

8. The air spring defined in claim 1 in which the second piston member is a two-piece member with a first member having a flat disc-shaped base formed with an outwardly projecting central boss and a pair of outwardly extending radial arms and a cylindrical wall extending from the base in an opposite direction from the central boss and into the pressure chamber; in which the annular-shaped outer wall forms the second member of the two-piece member; and in which the flexible sleeve is sealingly connected to the cylindrical wall of the first section within the interior of said annular-shaped outer wall.

9. The air spring defined in claim 8 in which the annular-shaped outer wall of the second piston member has a pair of spaced posts; and in which said posts extend through aligned holes formed in the radial arms of the disc-shaped base of the second piston member to mount said outer wall on said first section of the second piston member.

10. The air spring defined in claim 9 in which the annular-shaped outer wall has a conical configuration with a generally smooth cylindrical inner surface and a generally inwardly curved outer surface joined by a rounded edge.

11. An improved air spring for vehicles as defined in claim 1 in which the annular-shaped member extends about only the first piston member.

* * * * *